US006882623B1

United States Patent
Goren et al.

(10) Patent No.: US 6,882,623 B1
(45) Date of Patent: Apr. 19, 2005

(54) MULTI-LEVEL SCHEDULING METHOD FOR MULTIPLEXING PACKETS IN A COMMUNICATIONS NETWORK

(75) Inventors: Gilad Goren, Ephraim (IL); Mehahem Kaplan, Petah Tikva (IL); Reuven Zeitak, Rehovot (IL)

(73) Assignee: Native Networks Technologies Ltd., Petah Tiqua, IL (US)

( * ) Notice: Subject to any disclaimer, the term of this patent is extended or adjusted under 35 U.S.C. 154(b) by 0 days.

(21) Appl. No.: 09/572,194

(22) Filed: May 17, 2000

Related U.S. Application Data

(60) Provisional application No. 60/181,003, filed on Feb. 8, 2000.

(51) Int. Cl.[7] ............................... H04J 1/16; H04J 3/14
(52) U.S. Cl. .................... 370/230; 370/235; 370/395.2; 370/412; 370/428; 370/442
(58) Field of Search ................................ 370/230, 235, 370/395.2, 412, 428, 442, 231, 232, 233, 234, 413, 443, 444

(56) References Cited

U.S. PATENT DOCUMENTS

| | | | |
|---|---|---|---|
| 5,231,633 A | 7/1993 | Hluchyj et al. | |
| 5,274,644 A | 12/1993 | Berger et al. | |
| 5,377,327 A | 12/1994 | Jain et al. ..................... | 395/200 |
| 5,491,801 A | 2/1996 | Jain et al. ............... | 395/200.13 |
| 5,596,576 A | 1/1997 | Milito ......................... | 370/450 |
| 5,668,951 A | 9/1997 | Jain et al. ............... | 395/200.65 |
| 5,675,742 A | 10/1997 | Jain et al. ............... | 395/200.13 |
| 5,745,697 A | 4/1998 | Charny et al. ........... | 395/200.63 |
| 5,774,668 A | 6/1998 | Choquier et al. ....... | 395/200.53 |
| 5,828,835 A | 10/1998 | Isfeld et al. ............. | 395/200.3 |
| 5,831,971 A | 11/1998 | Bonomi et al. ............ | 370/230 |
| 5,850,399 A | 12/1998 | Ganmukhi et al. ......... | 370/412 |
| 5,889,956 A | 3/1999 | Hauser et al. | |
| 5,940,397 A | 8/1999 | Gritton | |
| 5,946,297 A | 8/1999 | Calvignac et al. .......... | 370/230 |
| 5,953,318 A * | 9/1999 | Nattkemper et al. ........ | 370/236 |
| 5,982,780 A | 11/1999 | Bohm et al. ................. | 370/450 |
| 5,991,812 A | 11/1999 | Srinivasan .................. | 709/232 |
| 5,996,013 A | 11/1999 | Delp et al. .................. | 709/226 |

(Continued)

FOREIGN PATENT DOCUMENTS

| | | | |
|---|---|---|---|
| EP | 0 843 499 A2 | 5/1998 | |
| EP | 0 901 301 A2 | 3/1999 | |
| EP | 0 942 557 A1 | 9/1999 | |
| EP | 1 001 574 A1 | 5/2000 | ........... H04L/12/56 |
| WO | WO 98/45976 | 10/1998 | |
| WO | 00/74322 A | 12/2000 | ........... H04L/12/56 |

OTHER PUBLICATIONS

International Search Report, Int'l Appl. No. PCT/US03/09664, Sep. 5, 2003, pp. 1–4.

(Continued)

*Primary Examiner*—Dang Ton
*Assistant Examiner*—Inder Pal Mehra

(57) ABSTRACT

A method and system for data traffic management in telecommunications networks is presented. End user data streams are aggregated to achieve more efficient use of a communication channel. Bandwidth is dynamically allocated to the data streams of the various users, effectively reducing their communications costs. The system includes a class of service selector and a plurality of stream selectors. Each stream selector is associated with a single budget category. Data is placed into queues according to a priority assigned by the end user. Data packets are transmitted from their queues through the class of service selector and through one of the stream selectors in response to the traffic provided by the end users and the budget category subscriptions of the end users.

20 Claims, 6 Drawing Sheets

U.S. PATENT DOCUMENTS

| | | | | |
|---|---|---|---|---|
| 6,088,732 | A | | 7/2000 | Smith et al. ............... 709/229 |
| 6,088,734 | A | | 7/2000 | Marin et al. ............... 709/232 |
| 6,108,703 | A | | 8/2000 | Leighton et al. ............ 709/226 |
| 6,108,782 | A | | 8/2000 | Fletcher et al. ............ 713/153 |
| 6,125,396 | A | | 9/2000 | Lowe ....................... 709/234 |
| 6,125,397 | A | | 9/2000 | Yoshimura et al. ......... 709/235 |
| 6,188,698 | B1 | * | 2/2001 | Galand et al. .............. 370/412 |
| 6,438,106 | B1 | * | 8/2002 | Pillar et al. ................ 370/232 |
| 6,614,790 | B1 | * | 9/2003 | Veres et al. ............. 370/395.2 |

OTHER PUBLICATIONS

Yang C–Q et al., "A Taxonomy for Congestion Control Algortihms in Packet Switching Networks", IEEE Network, IEEE Inc., New York, US, vol. 9, No. 4, Jul. 1, 1995, pp. 34–45.

Article 19 Amendment, Int'l Appl. No. PCT/US03/09664, Nov. 4, 2003, pp. 1–10.

Written Opinion, Int'l Appl. No. PCT/US03/09664, Jan. 28, 2004, pp. 1–9.

First Office Action, Chinese Pat. Appl. No. 01807815.X, Oct. 10, 2003, pp. 1–9.

International Search Report, Int'l Appl. No. PCT/US01/40047, Mar. 19, 2002, pp. 1–6.

International Preliminary Examination Report, Int'l Appl. No. PCT/US01/40047, Aug. 5, 2002, pp. 1–11.

First Written Opinion, Int'l Appl. No. PCT/US01/40047, Mar. 29, 2002, pp. 1–2.

Response to First Written Opinion, Int'l Appl. No. PCT/US01/40047. Jun. 27, 2002, pp. 1–15.

Second Written Opinion, Int'l Appl. No. PCT/US01/40047, May 29, 2002, pp. 1–8.

Response to Second Written Opinion and Article 34 Amendments, Int'l Appl. No. PCT/US01/40047, Jun. 27, 2002, pp. 1–7.

* cited by examiner

| USER | GUARANTEED BUDGET | REGULATED BUDGET | BEST EFFORT BUDGET |
|---|---|---|---|
| A | 25% | 0% | 1 |
| B | 25% | 0% | 4 |
| C | 50% | 0% | 1 |

| USER | GUARANTEED BUDGET | REGULATED BUDGET | BEST EFFORT BUDGET |
|---|---|---|---|
| A | 12.5% | 20% | 1 |
| B | 12.5% | 20% | 4 |
| C | 25% | 20% | 1 |

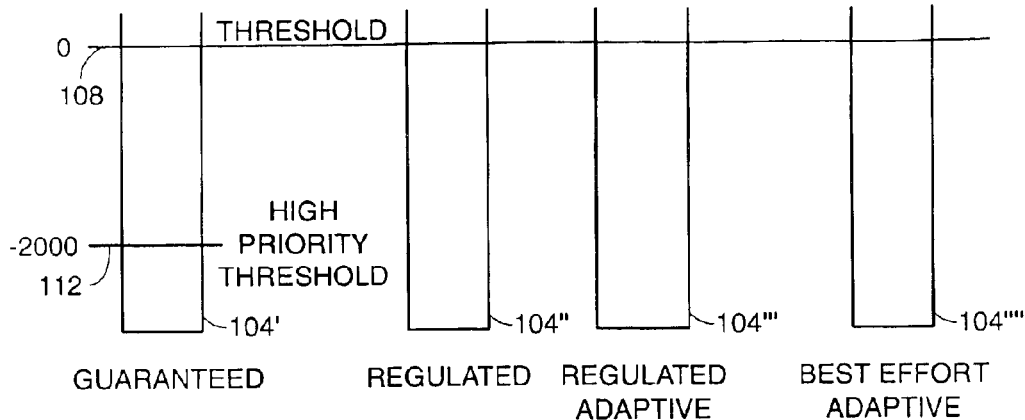

FIG. 5

(STEP 302)   GuaranteedTokenCounter[Client]=
             GuaranteedTokenCounter[Client]+GuaranteedRateResolution[Client]

(STEP 304)   GuaranteedTokenCounter[Client]=
             Min(GuaranteedTokenCounter[Client],PredeterminedValue1)

(STEP 306)   G_RegulatorHiEligible[Client] = FALSE
             G_RegulatorEligible[Client] = FALSE (STEP 308)   If(GuaranteedTokenCounter[Client]>PredeterminedValue2)
             then
             G_RegulatorHiEligible[Client] = TRUE (STEP 310)   If(GuaranteedTokenCounter[Client]=>PredeterminedValue1)
             then
             G_RegulatorEligible[Client] = TRUE;

(STEP 312)   Return To Step 302 if additional clients

FIG. 6

MULTI-LEVEL SCHEDULING METHOD FOR MULTIPLEXING PACKETS IN A COMMUNICATIONS NETWORK

CROSS-REFERENCE TO RELATED APPLICATION

This application claims priority to U.S. provisional patent application Ser. No. 60/181,003, filed Feb. 8, 2000.

FIELD OF THE INVENTION

The invention relates to the field of telecommunications and more specifically to management of packet transmission in aggregate user systems.

BACKGROUND OF THE INVENTION

High bandwidth telecommunication channels are frequently required in the instances when a user needs to transmit a digital data stream. Often the data stream includes data of different priority, ranging from high priority data (e.g., voice communications), which cannot tolerate significant delays, to low priority data (e.g., electronic mail).

Access to a communications network is typically provided by a telecommunications service provider who maintains equipment at a node on the network. Generally, service providers supply access to the network for multiple users. A user can supply multiple data streams. In order to secure sufficient capacity (i.e., bandwidth), users often contract for discrete channels, each channel capable of handling the greatest expected bandwidth requirement of a respective data stream. Typically, a channel is a physical trunk associated with a particular communications, a time slot allocation in a time division multiplexing (TDM) system or a specific frequency in a frequency division multiplexing system (e.g., a wavelength region in an optical wavelength division multiplexing (WDM) system).

A user having multiple data streams often must arrange for multiple discrete channels to support the maximum expected bandwidths of each data stream. Often, these channels are operating at a small fraction of the maximum bandwidth. As a result, the user purchases bandwidth capacity well beyond the average bandwidth required, resulting in higher costs than if the discrete channels were operating near maximum capacity at all times.

SUMMARY OF THE INVENTION

The claimed invention relates to a method of data transmission (i.e., traffic) management in telecommunication networks. Rather than supporting a discrete end user data stream with a dedicated fixed bandwidth communication channel, the data stream is multiplexed with other end user data streams to achieve more efficient use of the communication channel. Bandwidth is dynamically allocated to the various users, effectively reducing their communications costs. Telecommunications providers benefit from the higher resource utilization associated with the improved statistical multiplexing, and the associated reduction in support costs.

The invention relates to a method and multiplexer for multiplexing packets into a communication network.

In one embodiment the multiplexer includes a packet having a predefined class, a receiver receiving the packet, and a transmitter in communication with the receiver. The transmitter transmits the packet in response to a predefined budget and the predefined class of the packet. In this embodiment the predefined budget includes a plurality of predefined classes. In another embodiment the multiplexer also includes a communications network in communication with the transmitter.

In one embodiment the method includes the steps of receiving a packet having a predefined class and transmitting the packet in response to a predefined budget and the predefined class of the packet. In this embodiment the predefined budget includes a plurality of predefined classes. The predefined classes can be priority classes. In a further embodiment the predefined budget is one of a plurality of budgets.

In one embodiment the method includes receiving a packet having a predefined class and transmitting the packet over a communications network in response to a predefined budget and the predefined class of the packet. In this embodiment the predefined budget includes a plurality of predefined classes.

In one embodiment the multiplexer includes a class of service selector and a plurality of stream selectors. The class of service selector has a plurality of input terminals and an output terminal. Each stream selector is associated with a budget category and has a plurality of input terminals and an output terminal. One input terminal from each stream selector is in communication with the class of service selector. The class of service selector transmits a packet from one of its input terminals to a selected input terminal of one of the stream selectors in response to a request to send from the selected stream selector.

In one embodiment the multiplexer includes a plurality of class of service queues, each being in communication with one of the input terminals of the classes of service selector. In another embodiment the multiplexer includes a plurality of class of service selectors. Each of the class of service selectors has an output terminal and a plurality of input terminals. Each output terminal of the class of service selectors is in communication with one of the input terminals of each of the stream selectors. In yet another embodiment the multiplexer also includes a level selector having an input terminal in communication with a respective one of the plurality of stream selectors, and an output terminal. In a further embodiment the multiplexer also includes a rate limiter having input terminals in communication with the respective output terminals of the stream selectors and having output terminals in communication with the respective input terminals of the level selector.

In one embodiment the method includes the steps of receiving a packet in a class of service selector and allocating the packet to a stream selector in response to the availability of transmit eligibility rights from the stream selector. In a further embodiment the method also includes the steps of receiving the packet into one of a plurality of class of service queues prior to receiving the packet in the class of service selector. In another embodiment the method also includes the step of regulating the rate at which the packet is transmitted to the level selector. In yet another embodiment the method also includes the step of determining the eligibility of the packet prior to transmitting the packet.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

FIG. 5 is a depiction of the token counters according to one embodiment of the invention; and FIG. 6 is a flowchart representation of a sequence of steps for determining client transmission eligibility according to one embodiment of the invention.

DESCRIPTION OF THE PREFERRED EMBODIMENT

The user is allocated bandwidth according to the classes of service subscribed to. The user typically subscribes to various budget categories according to the importance (i.e., priority) of the data to be transmitted and the anticipated volume of traffic. Thus the user might subscribe to ten megabits/second of guaranteed bandwidth, ten megabits/second of regulated bandwidth, and a best effort weight of 20. Any bandwidth available for the best effort category is distributed to users according to the relative weights of their best effort subscriptions.

Figure 1:
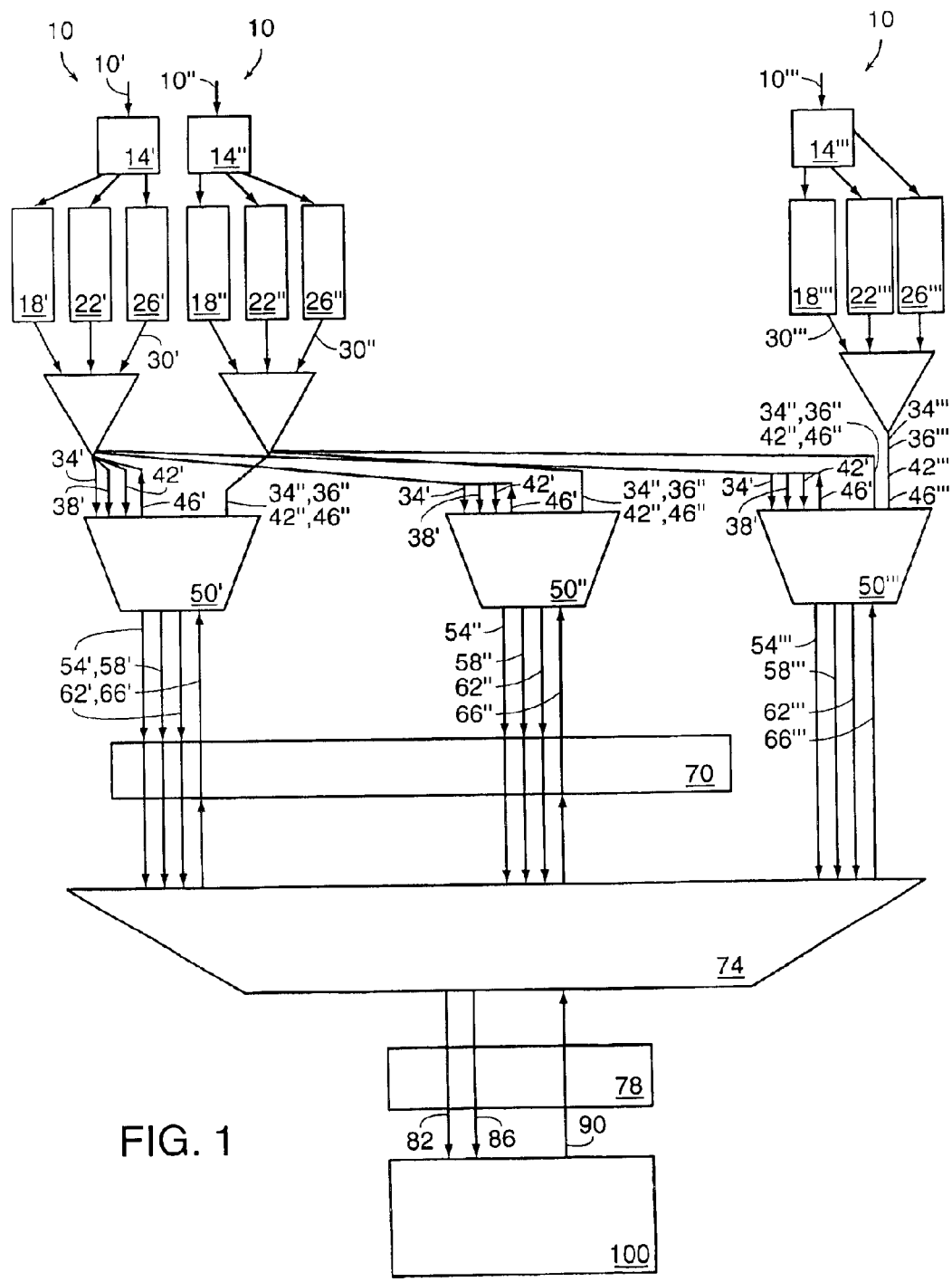
FIG. 1 is a high level block diagram of a system for multiplexing packets onto a communication channel according to one embodiment of the invention.

Referring to FIG. 1, data packets from each of the user data streams 10', 10", 10'" (generally 10) are received by a respective one of a plurality of header analyzers 14', 14", 14'" (generally 14). Each header analyzer 14 reads the header of the data packet from the user stream 10. The analyzer 14 then passes the data packet to one of the three class of service queues 18', 22', 26', 18", 22", 26", 18'", 22'", 26'" (generally 18, 22, 26) associated with the header analyzer 14.

Each of the class of service queues 18, 22, 26 corresponds to one of the data priorities: high priority, medium priority and low priority. For the purposes of this example, class of service queue 18 will correspond to high priority data, class of service queue 22 will correspond to medium priority data, and class of service queue 26 will correspond to the low priority data. If the header of the data packet from the user stream 10 indicates that the data packet is marked as high priority, the header analyzer 14 will place the packet into the high priority service queue 18. Similarly, if the packet header indicates that the packet is marked as medium priority or low priority, the packet will be placed in the medium priority service queue 22 or low priority service queue 26.

Once the packet is in one of the class of service queues 18, 22, 26, the packets are removed by class of service selectors 30', 30", 30'", (generally 30) from the queues 18, 22, 26 for submission to stream selectors 50', 50", 50'" (generally 50). Each class of service selector 30 is in communication with every stream selector 50 by way of four lines: high ready 34', 34", 34'" (generally 34); ready 38', 38", 38'" (generally 38); packet 42', 42", 42'" (generally 42); and transmit 44', 44", 44'" (generally 44). (Note that for the sake of clarity only the four lines 34, 38, 42, 44 of the first class of service selector 30, are shown explicitly.) The class of service selector 30 removes the packet from the class of service queue 18, 22, 26 and transmits the packet to one of the stream selectors 50 when instructed to do so by the stream selector 50. Each stream selector 50 corresponds to a respective one of the budget categories: guaranteed, regulated, or best effort. For the purposes of example only, stream selector 50' is associated with a guaranteed budget; stream selector 50" is associated with a regulated budget; and stream selector 50'" is associated with a best effort budget. The stream selectors 50 determine whether there is any bandwidth budget available for transmitting the packet in its corresponding budget category.

It is in the transfer of the data packet from the class of service queues 18, 22, 26 to stream selectors 50 that the system discloses its greatest flexibility. Instead of associating each class of service queue 18, 22, 26 with a unique one of the stream selectors 50', 50", 50'", the present system permits the class of service selector 30 to intelligently choose to which stream selector 50', 50", 50'" to send the packet. This decoupling of the class of service queues 18, 22, 26 from the stream selectors 50', 50", 50'" permits the user to share the resources between different class of service traffic flows (e.g., use guaranteed budget which is not being utilized by high priority traffic to deliver medium or low priority traffic).

For example if the class of service queue 18 had a high priority packet enqueued, and class of service queue 22 had a medium priority packet enqueued, the class of service selector 30 would transfer the high priority packet from queue 18 to the "first stream selector 50 that allows a packet transmission from the user 10. The budget of this stream selector 50 is immaterial, all packets leave through the first available stream selector 50'.

If both the guaranteed stream selector 50' and regulated stream selector 50" permit a packet to pass, the packet in queue 18 is delivered through the guaranteed stream selector 50'. To decide which stream selector 50 is used to transmit the packet, the streams selectors 50 are scanned to find the first available stream selector 50 for transmission. The scan first determines whether the guaranteed stream selector 50' is available and then whether the regulated stream selector 50" is available. Assuming that the guaranteed stream selector 50' does not allow a second packet to leave immediately after the first packet, the packet in queue 22 can pass through the regulated stream selector 50". If, however, class of service queue 18 did not have a high priority packet enqueued but class of service queue 22 had a medium priority packet enqueued, the class of service selector 30 would transfer the medium priority packet to guaranteed category stream selector 50'. Thus the user would be allowed to use the highest budget category available to which the user subscribed, while preserving the class of service priority among that user's data traffic.

Once the data packet is transferred to the stream selectors 50, the stream selector 50 transmits the data under instruction of the level selector 74. Stream selectors 50', 50" communicate with level selector 74 through a level rate regulator 70. The level rate regulator 70 preserves some minimal bandwidth for the best effort budget category which otherwise does not exist if there is actual overbooking of the regulated category. Setting this minimal bandwidth to zero can lead to best effort starvation, which could eventually result in timeouts at higher protocol layers (e.g., TCP) and consequent loss of the connection. Stream selector 50'", corresponding to the best effort category, communicates directly with the level selector 74 without the intervening level rate regulator 70. The stream selectors 50, communicate with the level selector 74 using four lines: eligible 54', 54", 54'" (generally 54); high-eligible 58', 58", 58'" (generally 58); packet 62', 62", 62'" (generally 62) and transmit 68', 68", 68'" (generally 68). The level selector 74 transmits the packet to the MAC layer 100 using three lines: eligible 82, packet 86 and transmit 90. In one embodiment the transfer occurs through a rate regulator 78.

In operation, the presence of a high priority packet in the class of service queue 18 causes the class of service selector 30 to indicate that there is a packet available for transmission by setting the high ready line 34 to stream selector 50. In turn, if there is available budget, the stream selector 50 indicates to the level selector 74 that a packet is ready for transmission by setting the high eligible line 54. The level selector 74 in turn sets the eligible line 82 to the MAC layer 100.

The MAC layer 100 sets the transmit line 90 informing the level selector 74 to transmit a packet. The level selector 74 then sets the transmit line 66 to the stream selector 50. The stream selector 74 in turn sets the transmit line 48 to the class of service selector 30. The class of service selector 30 then removes the packet from the class of service queue 18 and passes it by line 42 to the stream selector 50 which in turn passes it by way of line 62 to the level selector 74. The level selector 74 passes the packet by way of line 86 to the MAC layer 100.

Figures 2A, 2B:
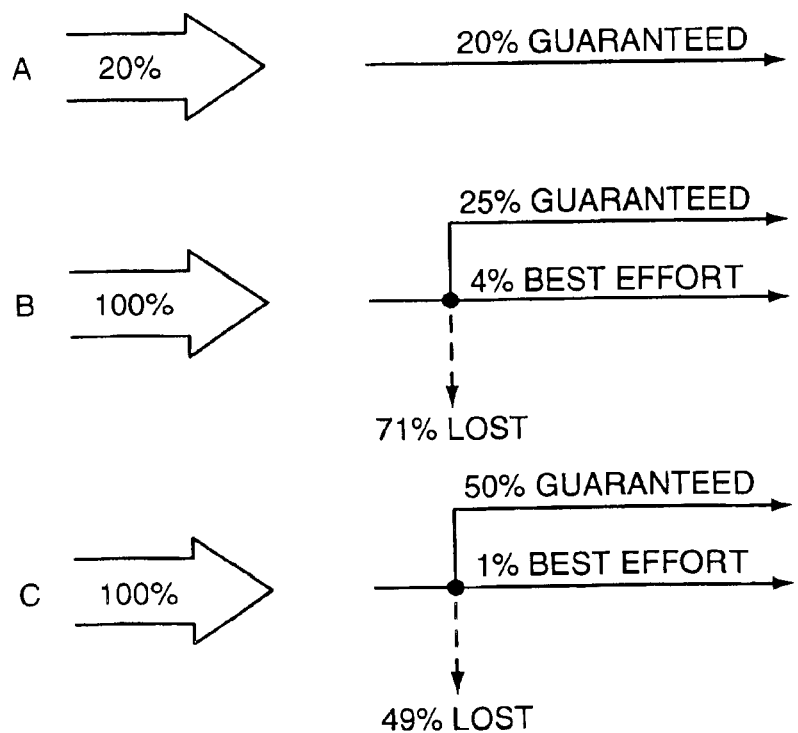
FIGS. 2A and 2B are depictions of budget category subscriptions and node bandwidth allocation, respectively, for an example of bandwidth allocation to multiple users according to one embodiment of the invention.

Referring to FIG. 2A for an example of bandwidth allocation according to one embodiment of the invention, users A, B and C enter into individual service level agreements (SLAs) defining their subscriptions for guaranteed, regulated and best effort budgets. All percentages indicated in the figures represent the relative portion of the total bandwidth of the node. User A has 25% of the node bandwidth under its guaranteed budget, 0% of the node bandwidth under regulated budget and a best effort weight of one. User B has 25% of the node bandwidth under its guaranteed budget, 0% of the regulated budget and a best effort weight of four. User C has 50% of the node bandwidth under its guaranteed budget, 0% of the regulated budget and a best effort weight of one. If all the users A, B and C simultaneously attempt to transmit more data than can be supported by their guaranteed bandwidth, each user is allocated guaranteed bandwidth exactly as described by their SLA and the node bandwidth is saturated by the guaranteed category traffic. As a result, no traffic is passed through the best effort budget selector. Consequently, the ratio of data transmitted between users A, B and C is 1:1:2.

Referring to FIG. 2B, if user A transmits at 20% of the node bandwidth and users B and C each transmit at 100% of the node bandwidth, the 5% surplus bandwidth which user A does not utilize is allocated according to the ratio of the best effort subscriptions of users B and C. Thus, users A, B and C utilize 20%, 29% and 51%, respectively, of the total node bandwidth. The 29% utilization for user B is divided such that the 25% is delivered through the guaranteed budget selector and 4% is delivered through the best effort budget selector. The 51% utilization for user B is divided such that the 50% is delivered through the guaranteed budget category selector and 1% is delivered through the best effort budget selector. Although user B attempts to transmit at 100% of the node bandwidth, only 29% of the node bandwidth is allocated to it and the remaining 71% of the traffic supplied by user B is buffered or lost depending on the available buffer size. User B only loses high priority data if more than 29% of its data is high priority data.

In the above example, none of the users A, B or C had subscribed to the regulated budget category. Any allocation of regulated budget bandwidth in any of the user SLAs in this example represents an infinite overbooking because there is no non-guaranteed bandwidth remaining for overbooking.

Figures 3A, 3B:
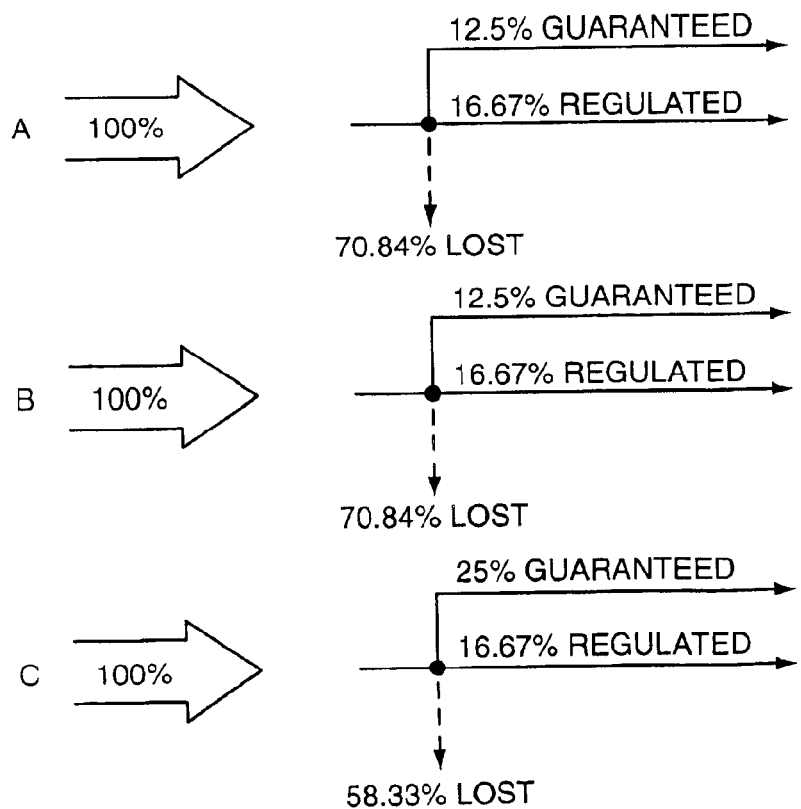
FIGS. 3A to 3C are depictions of budget category subscriptions and node bandwidth allocation for another example of bandwidth allocation to multiple users according to one embodiment of the invention.

Referring to FIG. 3A for another example of bandwidth allocation according to an embodiment of the invention, user A has 12.5% of the node bandwidth for its guaranteed budget, 20% of the node bandwidth for its regulated budget and a best effort weight of one. User B has 12.5% of the node bandwidth for the guaranteed budget, 20% of the node bandwidth for its regulated budget and a best effort weight of four. User C has 25% of the node bandwidth for its guaranteed budget, 20% of the node bandwidth for its regulated budget and a best effort weight of one. The subscriptions for the regulated budget category represent 60% of the node bandwidth while there is only 50% available after accounting for the guaranteed budgets, thus the regulated budget category overbooking is 120%.

Referring to FIG. 3B, if users A, B and C each submit traffic requiring 100% of the total node bandwidth, they are allocated 12.5%, 12.5% and 25%, respectively, under their guaranteed budgets. The remaining 50% of the total node bandwidth is allocated according to the regulated ratio 20:20:20 so that each user A, B and C is allocated an additional bandwidth of approximately 16.67% of the total node bandwidth. As a result, the best effort selector is never utilized and the total node bandwidth is distributed to users A, B and C as 29.17%, 29.17% and 41.67%, respectively.

Figure 3C:
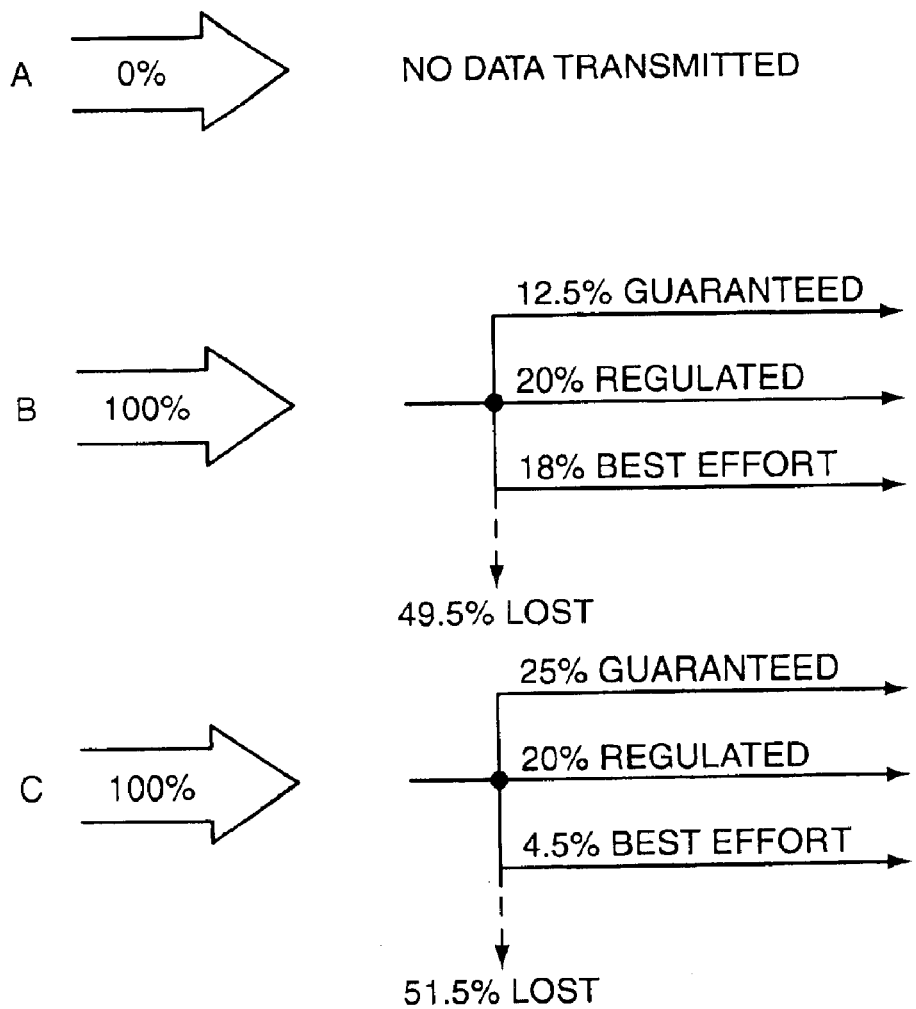

Referring to FIG. 3C, if user A does not submit any data but users B and C each submit 100% of the total node bandwidth, then user B is allocated 32.5% through its guaranteed and regulated budgets and user C is allocated 45% through its guaranteed and regulated budgets. A remainder of 22.5% of total node bandwidth is divided between users B and C according to the 4:1 ratio of their best effort weights. Consequently, 50.5% of the total node bandwidth is allocated to user B and 49.5% of the total node bandwidth is allocated to user C.

If user B submits only 40% of the total node bandwidth in high priority packets, 12.5% is delivered through the guaranteed budget selector, 20% is delivered through the regulated budget selector and the remainder is delivered through the best effort selector with lower priority packets.

Figure 4:
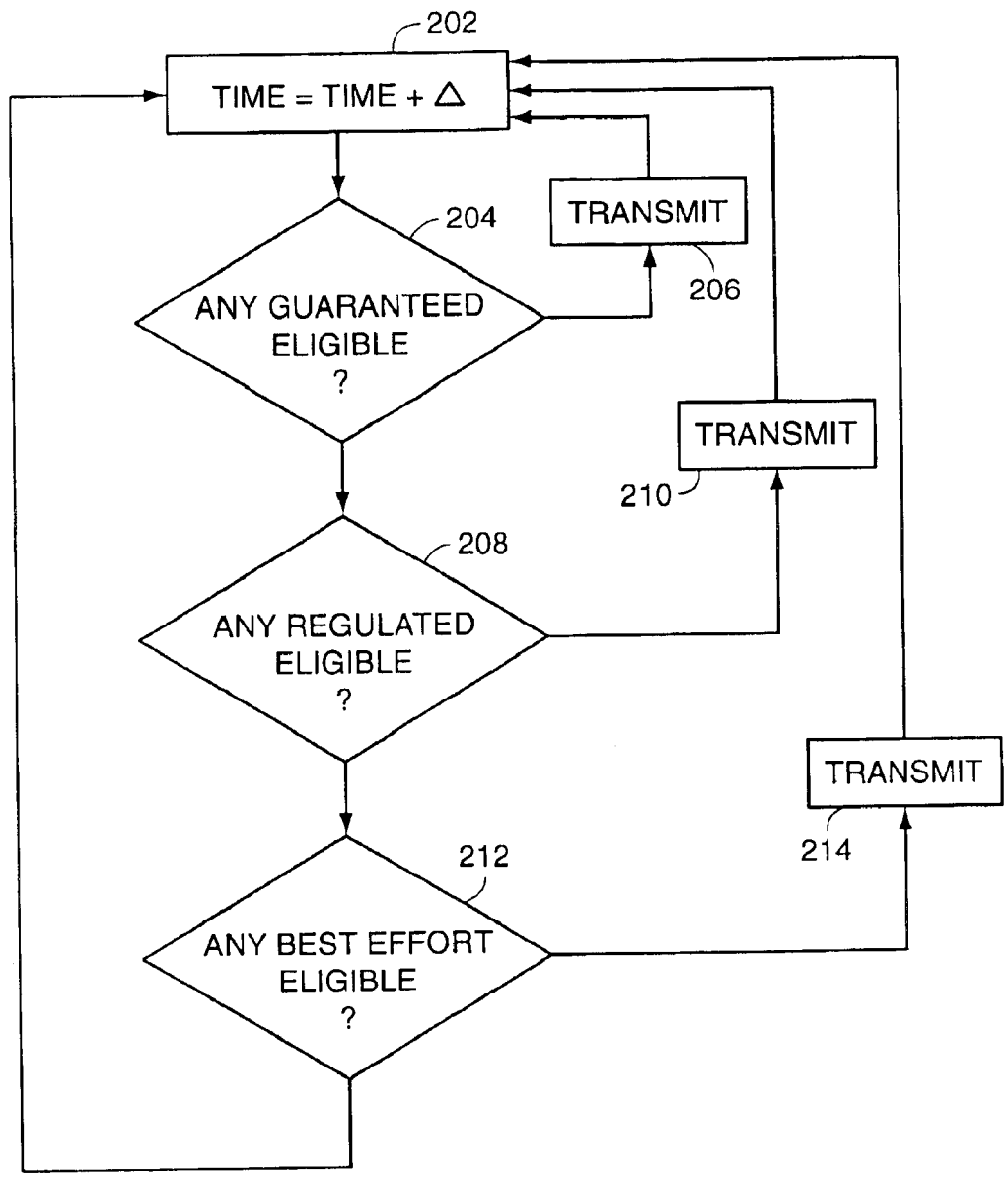
FIG. 4 is a flowchart representation of the sequence of events for scanning stream selectors according to one embodiment of the invention.

Referring again to FIG. 1, one of the stream selectors 50 is used to pass a packet from one of the queues 18, 22, 26 to the MAC layer 100 according to the availability of packets, the priority of the available packets and the SLAs for each user (client). In particular, the level selector 74 scans all the stream selectors 50 in descending priority order until it finds a stream selector 50 eligible to send a packet. FIG. 4 shows a flowchart depicting the sequence of events for scanning the stream selectors 50 of FIG. 1. In step 202 the level selector 74 waits a predetermined update time Δ before scanning the stream selectors 50. Eligibility of the guaranteed stream selector 50' to transmit a packet is determined first (step 204). If the guaranteed stream selector 50' is eligible, a packet is transmitted (step 206) from queues 18, 22, 26 to the MAC layer 100. Scanning then resumes at a time Δ later (step 202). If the guaranteed stream selector 50' is not eligible to transmit, the eligibility of the regulated stream selector 50" is determined (step 208). If the regulated selector 50' is eligible, a packet is transmitted (step 210) and scanning resumes at a time Δ later (step 202). Again if the regulated stream selector 50" is not eligible to transmit, eligibility to transmit using the best effort selector 50'" is next determined (step 212). Similarly, if the best effort selector 50''' is eligible, a packet is transmitted (step 214), otherwise no packet is transmitted and scanning resumes at a time Δ later (step 202).

One or more token counters are used for each stream selector 50, each of which corresponds to a budget category. The token counters are used to determine the selector's eligibility to transmit a packet from a given client. FIG. 5 is a conceptual illustration of token counters 104', 104'', 104''', 104'''' (generally 104) for the communications trunk multiplexer 5 of FIG. 1. Each token counter 104 has a token counter value which is updated by adding or removing tokens periodically both in response to a system clock and in response to the transmission of data packets.

At each update time, the token counter values are increased or credited for each client and for each budget according to predetermined update values. The update value for each token counter 104 is generally determined in response to the associated client's SLA allocation for the respective budget category. For example, if a first client subscribes to twice the guaranteed rate of a second client, the guaranteed token counter 104 of the first client is typically credited at twice the rate of that of the second client at each update. If a token counter value increases so that it is equal to or exceeds a predetermined value, a packet in that client's queue 18, 22, 26 is eligible for transmission for the corresponding budget category. If a token counter value continues to increase so that it reaches a second predetermined value, further crediting of the token counter 104 is ineffective in changing the token counter value. Thus, when a token counter 104 reaches the second predetermined value, it remains at that value until a data packet is transmitted. In one embodiment the first predetermined value is equal to the second predetermined value. After the packet is transmitted, the token counter value is decreased by an amount proportional to the length of the data packet.

The regulated and best effort budgets do not provide fixed bandwidth allocation, therefore a fairness mechanism, implemented as adaptive token counters 104''', 104'''', is used to determine the eligibility of these budget categories. The guaranteed budget corresponds to a fixed bandwidth and, therefore, no adaptive token counter is required. Because packets can only be sent using the best effort stream selector 50''' when the guaranteed and regulated stream selectors 50' and 50'', are not eligible, only the adaptive token counter 104'''' is used for the best effort budget.

A predetermined value 108 is used with all the buckets 104. The predetermined values 108 can vary according to their associated budget categories. Because a token counter value is decreased when a packet is sent through the corresponding selector 50, a packet arriving in a queue 18, 22, 26 just after an earlier packet has been transmitted cannot be transmitted through the same selector 50 until sufficient time has passed for the token counter value to again reach the predetermined value 108. To avoid this delay, the guaranteed token counter 104' has a second predetermined value 112 reserved for high priority packets. This high priority threshold 112 is established at a lower predetermined value.

Table 1 lists bits indicators used to determine the transmission eligibility for the token counters 104 for the embodiment shown in FIG. 5. Bit indicators PktPending and PktHiPending indicate whether a packet and a high priority packet, respectively, are available in the client's queues 22, 26 and high priority queues 18, respectively. G_RegulatorEligible and R_RegulatorEligible indicate whether the guaranteed token counter 104' and regulated token counter 104'', respectively, meet or exceed the predetermined value 108. Similarly, R_FairnessEligible and B_FairnessEligible indicate whether the regulated adaptive token counter 104''' and best effort adaptive token counter 104'''', respectively, have reached the predetermined value 108. G_RegulatorHiEligible indicates whether the guaranteed token counter value exceeds the second predetermined value 112. G_Eligible, R_Eligible and B_Eligible are defined by logical relationships with other bit indicators and indicate whether the guaranteed, regulated and best effort selectors 50', 50'', 50''', respectively, are eligible to transmit a data packet.

TABLE 1

| BIT INDICATOR | VALUE |
| --- | --- |
| PktPending | TRUE if any packet is in a queue |
| PktHiPending | TRUE if a high priority packet is in a queue |
| G_RegulatorEligible | TRUE for GuaranteedBucket ≧ 0 |
| R_RegulatorEligible | TRUE for RegulatedBucket ≧ 0 |
| R_FairnessEligible | TRUE for AdaptiveBucket ≧ 0 |
| B_FairnessEligible | TRUE for BestEffortBucket ≧ 0 |
| G_RegulatorHiEligible | TRUE for GuaranteedBucket > −2000 |
| G_Eligible | =(G_RegulatorEligible AND G_PktPending) OR (G_RegulatorHiEligible AND G_HiPktPending) |
| R_Eligible | =R_RegulatorEligible AND PktPending AND R_RateFairnessEligible |
| B_Eligible | =PktPending AND B_RateFairnessEligible |

FIG. 6 is a flowchart representation of an embodiment (according to FIG. 5 and Table 1) of a set of steps to determine the eligibility of a client to transmit data packets and high priority data packets using the guaranteed budget. These eligibilities are given by G_RegulatorEligible and G_RegulatorHiEligible, respectively. In step 302 the value of the guaranteed token counter for a client is credited by adding a guaranteed rate token resolution for the client. The guaranteed rate token resolution can vary for each client and is generally determined in response to the client's guaranteed bandwidth allocation. If the guaranteed token counter value is greater than the predetermined value 108, it is set equal to the predetermined value (step 304). The values of G_RegulatorEligible and G_RegulatorHiEligible are initialized to logical FALSE (step 306). If the guaranteed token counter value exceeds the second predetermined value 112, the value of G_RegulatorHiEligible is set equal to logic TRUE (step 308). If the guaranteed token counter value is equal to or greater than the predetermined value 108, the value of G_RegulatorEligible is set equal to logic TRUE (step 310). If one or more clients remain to be scanned at the present time, determination of eligibility for the guaranteed budget continues by returning to step 302. A client is eligible to transmit using its guaranteed budget if one of two conditions are satisfied: 1) G_RegulatorEligible is TRUE and there is a packet available in one of the client's queues 18,22,26, or 2) G_RegulatorHiEligible is TRUE and there is a high priority packet available in the client's high priority queue 18.

The eligibility to transmit using the regulated budget category is determined by examining both the regulated token counter 104'' and the regulated adaptive token counter 104'''. The rate at which the regulated token counter 104'' is credited varies according to the client's regulated budget defined in its SLA. The rate at which the adaptive token counter 104''' is credited is determined in response to the traffic attempting to use the regulated budget. Because the regulated budget category is subject to overbooking of clients for the available regulated bandwidth, multiple clients generating high volume traffic for the regulated budget category can sometimes result in bandwidth requirements that exceed the total allocated regulated bandwidth. As a result, buffers can fill while data packets await transmission and subsequent data packets will be lost. In order to ensure fairness to users under the regulated budget category, the rate at which the adaptive token counters 104''', 104'''' are credited (i.e., the adaptive rate) is slowed. A parameter called Stress is used to characterize the backlog or user load under such circumstances. In one embodiment Stress is defined as the number of clients eligible to transmit through the regulated budget. If the Stress value indicates that overbooking is not a problem (e.g., Stress equals zero), the adaptive rate is more than or equal to the client's regulated rate.

The regulated token counters 104'', 104''' are examined using a sequence of steps similar to those described above for the guaranteed token counter 104' except there is no comparison to the second predetermined value 112 (i.e., no equivalent step corresponding to step 308). If the regulated token counter 104'' is not less than the predetermined value 108, R_RegulatorEligible is set to logic TRUE. Similarly, if the regulated adaptive token counter 104''' is not less than the predetermined value 108, R_RateFairness Eligible is set to logic TRUE. A client is eligible to transmit using its regulated budget if the following three conditions are all satisfied: (1) R_RegulatorEligible is TRUE, (2) R_RateFairnessEligible is TRUE and (3) either PktPending is TRUE or PktHiPending is TRUE.

The eligibility of the best effort budget category is determined by examining the best effort adaptive token counter 104''''. The token counter 104'''' is examined using the steps described above for the regulated adaptive token counter 104'''. The crediting rate of the best effort adaptive token counter 104'''' is reduced in response to increasing Stress. The Stress parameter for the regulated and best effort budgets can be defined differently. In one embodiment Stress used for regulated budget is defined as the number of clients that are eligible for the regulated budget and Stress used for the best effort budget is defined as the number of clients eligible to transmit through the best effort budget. If the value of the best effort adaptive token counter 104'''' is equal to or greater than the predetermined value 108, B_RateFairnessEligible is set to logic TRUE. A client is eligible to transmit using its best effort budget if B_RateFairnessEligible is TRUE and there is a packet available in one of the client's queues 18,22,26.

By way of example, Table 2 defines the SLA allocations for three clients. Client A subscribes to a guaranteed rate of 1,000 octets (i.e., 1,000 8-bit bytes) per millisecond. Client B subscribes to a guaranteed rate of 2,000 octets per millisecond and a regulated rate of 5,000 octets per millisecond. Client C subscribes to a guaranteed rate of 3,000 octets per millisecond, a regulated rate of 9,000 octets per millisecond and a best effort weight of 1. Neither Client A or Client B subscribe to the best effort allocation. In this example, all clients transmit packets that are 1,000 octets long and the maximum packet is 2,000 octets long.

TABLE 2

| CLIENT | GUARANTEED RATE (OCTETS/MS) | REGULATED RATE (OCTETS/MS) |
| --- | --- | --- |
| A | 1000 | 0 |
| B | 2000 | 5000 |
| C | 3000 | 9000 |

Table 3 is a timeline showing an illustrative example of packet transmission for the clients defined in Table 2. Columns labeled A(G), B(G) and C(G) correspond to the guaranteed token counter values for clients A, B and C, respectively. Columns labeled B(R), B(A), C(R) and C(A) correspond to the regulated and adaptive token counter values, respectively, for clients B and C, respectively. Stress indicates the number of clients eligible to transmit under the regulated and best effort budgets. In this example the predetermined value is 0 and the second predetermined value is −2000.

TABLE 3

| Time | Ticks | Adaptive ticks | A(G) | B(G) | C(G) | B(R) | B(A) | C(R) | C(A) | Transmitting Client/Budget | Stress |
| --- | --- | --- | --- | --- | --- | --- | --- | --- | --- | --- | --- |
| 0 | 0 | 0 | 0 | 0 | 0 | 0 | 0 | 0 | 0 | A/G | 2 |
| 0.1 | 10 | 2 | −900 | 0 | 0 | 0 | 0 | 0 | 0 | B/G | 2 |
| 0.2 | 20 | 4 | −800 | −800 | 0 | 0 | 0 | 0 | 0 | A/G | 2 |
| 0.3 | 30 | 6 | −1700 | −600 | 0 | 0 | 0 | 0 | 0 | B/G | 2 |
| 0.4 | 40 | 8 | −1600 | −1400 | 0 | 0 | 0 | 0 | 0 | A/G | 2 |
| 0.5 | 50 | 10 | −2500 | −1200 | 0 | 0 | 0 | 0 | 0 | B/G | 2 |
| 0.6 | 60 | 12 | −2400 | −2000 | 0 | 0 | 0 | 0 | 0 | C/G | 2 |
| 0.7 | 70 | 14 | −2300 | −1800 | −700 | 0 | 0 | 0 | 0 | B/G | 2 |
| 0.8 | 80 | 16 | −2200 | −2600 | −400 | 0 | 0 | 0 | 0 | B/R | 1 |
| 0.85 | 85 | 17 | −2150 | −2500 | −250 | −750 | −950 | 0 | 0 | NULL | 1 |
| 0.9 | 90 | 18 | −2100 | −2400 | −100 | −500 | −900 | 0 | 0 | C/R | 0 |
| 1 | 100 | 28 | −2000 | −2200 | 0 | 0 | −400 | −100 | −100 | C/G | 0 |
| 1.01 | 101 | 29 | −1990 | −2180 | −970 | 0 | −350 | −10 | −10 | NULL | 0 |
| 1.02 | 102 | 30 | −1980 | −2160 | −940 | 0 | −300 | 0 | 0 | NULL | 1 |
| 1.03 | 103 | 30.2 | −1970 | −2140 | −910 | 0 | −300 | 0 | 0 | NULL | 1 |
| 1.04 | 104 | 30.4 | −1960 | −2120 | −880 | 0 | −300 | 0 | 0 | NULL | 1 |
| 1.05 | 105 | 30.6 | −1950 | −2100 | −850 | 0 | −300 | 0 | 0 | NULL | 1 |
| 1.06 | 106 | 30.8 | −1940 | −2080 | −820 | 0 | −300 | 0 | 0 | NULL | 1 |
| 1.07 | 107 | 31 | −1930 | −2060 | −790 | 0 | −250 | 0 | 0 | NULL | 1 |
| 1.08 | 108 | 31.2 | −1920 | −2040 | −760 | 0 | −250 | 0 | 0 | NULL | 1 |

TABLE 3-continued

| Time | Ticks | Adaptive ticks | A(G) | B(G) | C(G) | B(R) | B(A) | C(R) | C(A) | Transmitting Client/Budget | Stress |
|---|---|---|---|---|---|---|---|---|---|---|---|
| 1.09 | 109 | 31.4 | −1910 | −2020 | −730 | 0 | −250 | 0 | 0 | NULL | 1 |
| 1.1 | 110 | 31.6 | −1900 | −2000 | −700 | 0 | −250 | 0 | 0 | A/G | 1 |
| 1.12 | 112 | 32 | −2880 | −1960 | −640 | 0 | −200 | 0 | 0 | NULL | 1 |
| 1.17 | 117 | 33 | −2830 | −1860 | −490 | 0 | −150 | 0 | 0 | NULL | 1 |
| 1.2 | 120 | 33.6 | −2800 | −1800 | −400 | 0 | −150 | 0 | 0 | B/G | 1 |
| 1.22 | 122 | 34 | −2780 | −2760 | −340 | 0 | −100 | 0 | 0 | NULL | 1 |
| 1.27 | 127 | 35 | −2730 | −2660 | −190 | 0 | −50 | 0 | 0 | NULL | 1 |
| 1.3 | 130 | 35.6 | −2700 | −2600 | −100 | 0 | −50 | 0 | 0 | C/R | 0 |
| 1.32 | 132 | 36 | −2680 | −2560 | −40 | 0 | 0 | −820 | −910 | NULL | 1 |
| 1.37 | 137 | 37 | −2630 | −2460 | 0 | 0 | 0 | −370 | −820 | NULL | 1 |
| 1.4 | 140 | 37.6 | −2600 | −2400 | 0 | 0 | 0 | −100 | −820 | C/G | 1 |
| 1.42 | 142 | 38 | −2580 | −2360 | −940 | 0 | 0 | 0 | −730 | NULL | 1 |
| 1.47 | 147 | 39 | −2530 | −2260 | −850 | 0 | 0 | 0 | −640 | NULL | 1 |
| 1.5 | 150 | 39.6 | −2500 | −2200 | −910 | 0 | 0 | 0 | −640 | B/R | 0 |
| 1.52 | 152 | 40 | −2480 | −2160 | −940 | −940 | −970 | 0 | −550 | NULL | 0 |
| 1.53 | 153 | 41 | −2470 | −2140 | −910 | −910 | −940 | 0 | −460 | NULL | 0 |
| 1.54 | 154 | 42 | −2460 | −2120 | −880 | −880 | −910 | 0 | −370 | NULL | 0 |
| 1.55 | 155 | 43 | −2450 | −2100 | −850 | −850 | −880 | 0 | −280 | NULL | 0 |
| 1.56 | 156 | 44 | −2440 | −2080 | −820 | −820 | −850 | 0 | −190 | NULL | 0 |
| 1.57 | 157 | 45 | −2430 | −2060 | −790 | −790 | −820 | 0 | −100 | NULL | 0 |
| 1.58 | 158 | 46 | −2420 | −2040 | −760 | −760 | −790 | 0 | −10 | NULL | 0 |
| 1.59 | 159 | 46.2 | −2410 | −2020 | −730 | −730 | −760 | 0 | 0 | NULL | 1 |
| 1.6 | 160 | 47.2 | −2400 | −2000 | −700 | −700 | −760 | 0 | 0 | C/R | 0 |

In this example the tick rate is 100 events (ticks) per millisecond. After a packet is transmitted through the guaranteed stream selector 50, the corresponding guaranteed token counter is decremented by the packet length times the length resolution. Because A is allocated 1,000 octets/ms, the guaranteed token counter value should reach the predetermined value one time each millisecond. The rate token resolution for client A is set to 10 to achieve this token counter crediting rate. Thus the guaranteed token counter value for A is reduced by 1,000 after the transmission and returns to its original value after 100 ticks (1.00 ms). The token rate resolutions for clients B and C are similarly determined. Token rate resolutions for clients A, B and C are listed in Table 4. A high priority threshold (i.e., second predetermined value) of −2000 is set for the guaranteed token counters only and is based on a maximum packet size of 2000 octets.

TABLE 4

| CLIENT | GUARANTEED TOKEN RATE RESOLUTION | REGULATED TOKEN RATE RESOLUTION | ADAPTIVE TOKEN RATE RESOLUTION | SECOND PREDETERMINED VALUE |
|---|---|---|---|---|
| A | 10 | 0 | 0 | −2000 |
| B | 20 | 50 | 50 | −2000 |
| C | 30 | 90 | 90 | −2000 |

In this example at time=0, all three clients are active and backlogged (saturated), clients A and B have only high priority packets and client C has only low priority packets. The node rate is 10,000 octets/ms, thus a packet is sent approximately once every 0.1 ms. Both client A and client B could send a high priority packet, however, the guaranteed selector 50 can only choose one of them for delivery in a sequential (round robin) manner. After each transmission, the respective guaranteed token counter is decreased by 1000. Thus client A sends a packet and 0.1 ms later client B sends a packet. This alternating transmission sequence continues as long as the guaranteed token counter values for clients A and B remain above −2000.

At time=0.6 ms neither client A or client B has a guaranteed token counter value above the high priority threshold. Client C can finally transmit its lower priority packet using its guaranteed budget. At time=0.7 ms client B has a guaranteed token counter value of −1800 and can now transmit a high priority packet.

At time=0.8 clients A, B and C have used up their guaranteed budgets thus the regulated categories for B and C determine who transmits next. Because the node is overbooked (i.e., Stress is greater than zero), clients B and C will not be able to supply packets at their requested rates. The communications trunk multiplexer 5 responds by slowing the rate at which the adaptive token counters are credited (i.e., the adaptive tick rate). A packet is transmitted from client B under its regulated budget and the Stress is reduced to 1 because B is no longer eligible under the regulated budget. At time 0.85 ms client B's regulated token counter value is increasing faster than its regulated adaptive token counter value due to the difference in crediting rates.

At time=0.9 ms client C transmits a packet through its regulated budget because all of the other client budgets are below their thresholds. At time=1.0 ms client C transmits a packet through its guaranteed budget because the corresponding token counter value has recovered to the zero threshold. Additional times are included in the timeline to further illustrate the principles of operation of the communications trunk multiplexer 5.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of multiplexing packets from a plurality of users, the method comprising:
   subscribing each of a plurality of users to a transmission budget having a plurality of categories, each budget category having a resource guarantee level and, for each user, an associated credit level initially selected by a user;

receiving packets from the plurality of users, each packet having a predefined service class;

dynamically assigning each packet to one of the plurality of budget categories based on (i) the service class of the packet, (ii) the user originating the packet, (iii) the credit levels of the originating user's transmission budget categories, and (iv) a current availability of each budget category; and decreasing the credit level of the originating user's budget category to which the packet was assigned.

2. The method of claim 1 wherein said predefined service class is a priority class.

3. The method of claim 1 wherein the credit level associated with at least one budget category relates to an amount of available bandwidth.

4. The method of claim 1 wherein the credit level associated with at least one budget category relates to a weight governing distribution of bandwidth among users.

5. The method of claim 1 wherein the plurality of budget categories comprise a guaranteed budget category, a regulated budget category, and a best effort budget category.

6. The method of claim 5 wherein the credit levels of the guaranteed budget category and the regulated budget category relate to an amount of available bandwidth, and the credit levels of the best effort budget category relate to a weight governing distribution of bandwidth among users.

7. A packet multiplexing system comprising:
an input for receiving packets from a plurality of users, each packet having a predefined service class, each user having an associated transmission budget;
a transmitter comprising a plurality of stream selectors each associated with a transmission budget category; and
at least one service selector for dynamically assigning each received packet to one of the stream selectors based on (i) the service class of the packet, (ii) the user originating the packet, (iii) the originating user's transmission budget, and (iv) a current availability of each stream selector.

8. The packet multiplexing system of claim 7 further comprising a communications network in communication with said transmitter, said communications network receiving said packet transmitted from said transmitter.

9. A communications trunk multiplexer comprising:
a class of service selector having a class of service selector output terminal and a plurality of class of service selector input terminals; and
a plurality of stream selectors, each of said plurality of stream selectors having a stream selector output terminal and a plurality of stream selector input terminals, one of each of said stream selector input terminals in communication with said class of service selector output terminal,
wherein each of said plurality of stream selectors is associated with one of a plurality of budget categories;
wherein said class of service selector transmits a packet received from one of said plurality of said class of service input terminals to a selected one of said plurality of stream selector input terminals in response to a request to send for said class of service selector from said selected one of said plurality of stream selectors.

10. The communications trunk multiplexer of claim 9 wherein said plurality of stream selectors comprises a stream selector being associated with a best efforts budget, a stream selector being associated with a regulated delivery budget, and a stream selector being associated with a guaranteed bandwidth budget.

11. The communications trunk multiplexer of claim 9 further comprising a plurality of class of service queues, each of said class of service queues in communication with a respective one of said plurality of class of service selector input terminals.

12. The communications trunk multiplexer of claim 11 further comprising a plurality of class of service selectors, each class of service selector having a class of service selector output terminal and a plurality of class of service selector input terminals, each class of service selector output terminal in communication with one of said plurality of stream selector input terminals of each of said plurality of stream selectors.

13. The communications trunk multiplexer of claim 9 further comprising a level selector having an output terminal and a plurality of level selector input terminals, each of said level selector input terminals being in communication with said stream selector output terminal of a respective one of said plurality of stream selectors.

14. The communications trunk multiplexer of claim 13 further comprising a rate limiter, said rate limiter having a plurality of rate limiter input terminals and a plurality of rate limiter output terminals, each of said rate limiter input terminals in communication with the output terminal of a respective stream selector and each of said rate limiter output terminals in communication with a respective one of said plurality of level selector input terminals.

15. A communications network comprising:
a communications trunk multiplexer comprising:
a class of service selector having a class of service selector output terminal and a plurality of class of service selector input terminals;
a plurality of stream selectors, each of said plurality of stream selectors having a stream selector output terminal and a plurality of stream selector input terminals, one of said stream selector input terminals of each of said plurality of stream selectors in communication with said class of service selector output terminal; and
a level selector having an output terminal and a plurality of level selector input terminals, each of said plurality of level selector input terminals being in communication with a respective one of said stream selector output terminals,
a plurality of class of service queues, each of said class of service queues in communication with a respective one of said plurality of class of service selector input terminals;
a header analyzer having a header analyzer input terminal to receive a communications packet stream and a plurality of header analyzer output terminals, each of said header analyzer output terminals in communication with a respective one of said plurality of class of service queues; and
a MAC interface having a MAC input terminal in communication with said level selector output terminal,
wherein each of said plurality of stream selectors is associated with one of a plurality of budget categories,
wherein said class of service selector transmits a packet from one of said plurality of class of service queues to a selected one of said plurality of stream selector input terminals in response to a request to send received at said class of service selector from the stream selector having said selected stream selector input.

16. The communications network of claim 15 further comprising a rate limiter, said rate limiter having a plurality of rate limiter input terminals and a plurality of rate limiter output terminals, each of said plurality of rate limiter input terminals in communication with said stream selector output terminal of one of said plurality of stream selectors.

17. The communications network of claim 15 further comprising a rate regulator, said rate regulator having a rate regulator input terminal and a rate regulator output terminal, said rate regulator input terminal in communication with said level selector output terminal and said rate regulator output terminal in communication with said MAC input terminal.

18. The communications network of claim 17 wherein said MAC interface has a node ready output terminal and said rate regulator has a node request input terminal, said rate regulator provides a packet at said rate regulator output terminal in response, at least in part, to a signal provided by said MAC interface at said node ready output terminal.

19. The communications network of claim 15 wherein said MAC interface comprises a rate regulator having a rate regulator input terminal, said rate regulator input terminal being said MAC input terminal.

20. A method of multiplexing communications packets from a plurality of users, each packet having a priority class, said method comprising:

subscribing a plurality of users to at least a first budget category, each of the plurality of users having a weight associated with the first budget category and at least one token counter, the token counter indicating eligibility of the user and the weight governing distribution of bandwidth among users;

if at least one of the plurality of users is eligible for the first budget category, adaptively slowing down the first budget category token counters associated with the eligible users proportional relative subscribed weights; and if none of the plurality of users is eligible for the first budget category, adaptively speeding up the first budget category token counters associated with the plurality of the users proportional to their relative subscribed weights.

* * * * *